(12) United States Patent
Sun et al.

(10) Patent No.: US 10,318,392 B2
(45) Date of Patent: Jun. 11, 2019

(54) MANAGEMENT SYSTEM FOR VIRTUAL MACHINE FAILURE DETECTION AND RECOVERY

(71) Applicant: NEC Corporation, Tokyo (JP)

(72) Inventors: Lei Sun, Tokyo (JP); Shinya Miyakawa, Tokyo (JP); Masaki Kan, Tokyo (JP); Jun Suzuki, Tokyo (JP); Yuki Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 15/517,031

(22) PCT Filed: Oct. 6, 2014

(86) PCT No.: PCT/JP2014/005078
§ 371 (c)(1),
(2) Date: Apr. 5, 2017

(87) PCT Pub. No.: WO2016/056035
PCT Pub. Date: Apr. 14, 2016

(65) Prior Publication Data
US 2017/0293537 A1    Oct. 12, 2017

(51) Int. Cl.
*G06F 11/00* (2006.01)
*G06F 11/20* (2006.01)
(Continued)

(52) U.S. Cl.
CPC ............. *G06F 11/203* (2013.01); *G06F 9/46* (2013.01); *G06F 11/1484* (2013.01);
(Continued)

(58) Field of Classification Search
CPC ............. G06F 11/0709; G06F 11/0712; G06F 11/0751; G06F 11/0757; G06F 11/1484;
(Continued)

(56) References Cited

U.S. PATENT DOCUMENTS 9,497,136 B1\* 11/2016 Ramarao ............. G06F 9/45558
9,612,923 B1\* 4/2017 Shaw ................... G06F 11/2028
(Continued)

FOREIGN PATENT DOCUMENTS

JP    2008-181387 A    8/2008
JP    2010-198491 A    9/2010
(Continued)

OTHER PUBLICATIONS

Vmware, "Configuration Maximums, vSphere 5.5," 2013, pp. 1-10.
(Continued)

*Primary Examiner* — Marc Duncan
(74) *Attorney, Agent, or Firm* — Sughrue Mion, PLLC (57) ABSTRACT

A Management system 10 includes: resource pools $11_1$-$11_4$ which act as the hardware components on which multiple virtual machines are running; an inter-connecting network 12 which connects various resource pools; and a HA manager 13 which snoops all traffic of the inter-connecting network 12 to detect failure of a target VM and triggers corresponded actions when failure is detected.

8 Claims, 11 Drawing Sheets

(51) Int. Cl.
  *G06F 13/10* (2006.01)
  *G06F 9/46* (2006.01)
  *G06F 11/30* (2006.01)
  *G06F 11/14* (2006.01)
  *G06F 11/34* (2006.01)

(52) U.S. Cl.
  CPC .............. *G06F 11/30* (2013.01); *G06F 13/10* (2013.01); *G06F 11/202* (2013.01); *G06F 11/3409* (2013.01); *G06F 2201/815* (2013.01)

(58) Field of Classification Search
  CPC ...... G06F 11/202; G06F 11/203; G06F 11/30; G06F 11/301; G06F 11/3409; G06F 9/45533; G06F 2009/45575; G06F 2009/45591
  See application file for complete search history.

(56) References Cited

U.S. PATENT DOCUMENTS

| | | | | |
|---|---|---|---|---|
| 9,647,909 B2 * | 5/2017 | Kuan | ................... | H04L 43/0817 |
| 2011/0314470 A1 * | 12/2011 | Elyashev | ............ | G06F 11/1484 718/1 |
| 2012/0210318 A1 * | 8/2012 | Sanghvi | .............. | G06F 9/45558 718/1 |
| 2013/0080625 A1 | 3/2013 | Morinaga et al. | | |

FOREIGN PATENT DOCUMENTS

| | | |
|---|---|---|
| JP | 2012-004781 A | 1/2012 |
| JP | 2013-73405 A | 4/2013 |

OTHER PUBLICATIONS

"ExpEther (Express Ethernet) Consortium", (online), ExpEther Consortium, (search on Sep. 22, 2014), www.expether.org/etechnology.html.
Sangjin Han, et al., "Network Support for Resource Disaggregation in Next-Generation Datacenters", ACM HotNets 2013, pp. 1-7.
"I/O Virtualization: SR-IOV", (online), PCI-SIG, (search on Sep. 22, 2014), www.pcisig.com/specifications/iov.
ETSI, "Network Functions Virtualization Technology Leaflet," 2014, pp. 1-2.
Vmware, "vSphere Availability Guide, ESXi 5.5, vCenter Server 5.5," 2013, pp. 1-56.
International Search Report of PCT/JP2014/005078, dated Dec. 16, 2014. [PCT/ISA/210].
Written Opinion of PCT/JP2014/005078, dated Dec. 16, 2014. [PCT/ISA/237].
Communication dated Oct. 24, 2017 from the Japanese Patent Office in counterpart Application No. 2017-518275.

* cited by examiner

MANAGEMENT SYSTEM FOR VIRTUAL MACHINE FAILURE DETECTION AND RECOVERY

CROSS REFERENCE TO RELATED APPLICATIONS

This application is a National Stage of International Application No. PCT/JP2014/005078 filed Oct. 6, 2014, the contents of all of which are incorporated herein by reference in their entirety.

TECHNICAL FIELD

The present invention relates to a management system, a management method, and a management program in the technical field of high availability (HA), and more particularly, relates to a management system, a management method, and a management program to provide highly availability of virtual machine (VM) in the system virtualization environment.

BACKGROUND ART

Telecommunication networks usually consist of various proprietary hardware appliances. Deploying a new network service requires consideration of both the target hardware network appliances and many other related hardware network appliance, for example how to integrate and deploy these appliances. Moreover, hardware lifecycles are becoming shorter as innovation accelerates, which also result in reduce of the return on investment of deploying new services and further constraining innovation in the area of telecommunication network.

Network Functions Virtualization (NFV) described in Non Patent Literature (NPL) 1 aims to address the above problems by evolving standard IT virtualization technology to consolidate many network equipment types into industry standard high volume servers, switches and storage. It deploys network functions in software that can run on a range of industry standard server hardware.

Telecommunication networks are known for the HA, which is supported by highly customized proprietary legacy hardware appliances. While in the environment of NFV, software appliances (also known as virtual machines) are used instead of customized proprietary hardware appliances. Therefore, how to enhance HA of software appliances (VM) in NFV becomes a hot topic.

Software appliance, such as virtual machines, can be executed by a group or cluster of host computing devices. In the current data center architecture, the host computing devices are enterprise servers. While under the resource disaggregation architecture, the host computing devices may refer to the computing resource pool (also known as Central Processing Unit (CPU) pool).

Figure 1:
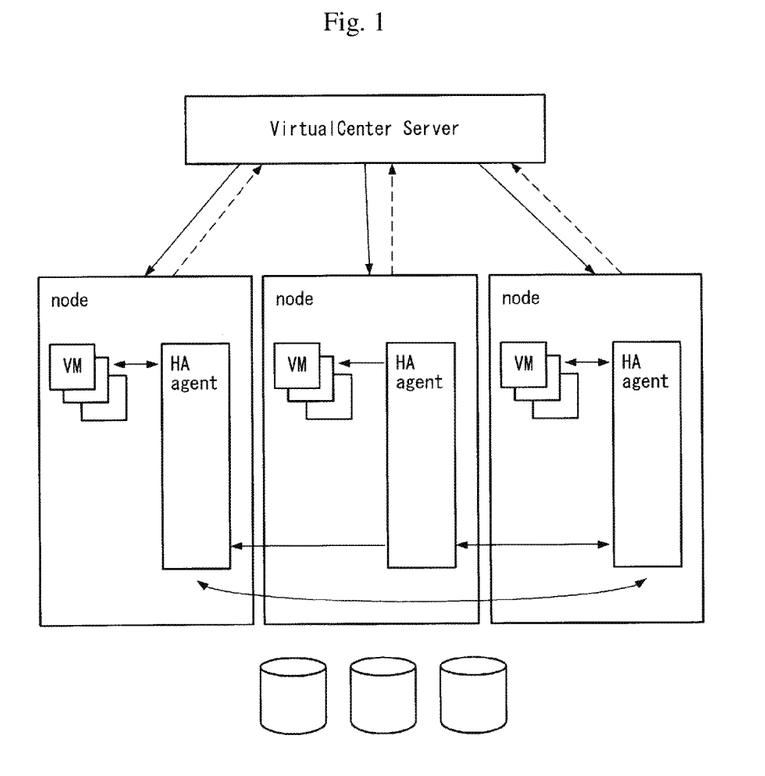
FIG. 1 It is an explanatory diagram depicting system architecture of HA at VMM layer described in NPL 4.

VMware has implemented the feature of failure detection and resetting VM at virtual machine monitor (VMM) layer in vSphere described in NPL 4. FIG. 1 is an explanatory diagram depicting system architecture of HA at VMM layer described in NPL 4.

According to its architecture illustrated in FIG. 1, there is an HA-agent in each node (refers an enterprise server). Among the nodes, there is a single selected master node and the rest of the nodes are all slave nodes. The HA-agent in the master node is in charge of monitoring the availability of local VMs and communicates with other slave HA-agents to make sure the availability of the slave node. So that when an HA-VM fails, another available node will be selected and then the HA-VM will be launched on the selected node.

According the maximum configuration manual described in NPL 5, it shows that the VMM layer HA solution suffers from scalability. The maximum supported number of nodes is limited to 32. When HA option is enabled, in the 32 nodes deployment environment, there are maximum 64 HA-VM can be supported in each node. While when HA is disabled, in the 32 nodes deployment environment, there are maximum 100 VM can be supported in each node.

CITATION LIST

Patent Literature

PTL 1: Patent 2008-181387

Non Patent Literature

NPL 1: Sangjin Han, Norbert Egi, Aurojit Panda, Sylvia Ratnasamy, Guangyu Shi, and Scott Shenker, "Network Support for Resource Disaggregation in Next-Generation Data Centers," ACM HotNets 2013, pp. 1-7.
NPL 2: "ExpEther (Express Ethernet) Consortium", (online), ExpEther Consortium, (search on Sep. 22, 2014), www.expether.org/etechnology.html.
NPL 3: ETSI, "Network Functions Virtualization Technology Leaflet," 2014, pp. 1-2.
NPL 4: vmware, "vSphere Availability Guide, ESXi 5.5, vCenter Server 5.5," 2013, pp. 1-56.
NPL 5: vmware, "Configuration Maximums, vSphere 5.5," 2013, pp. 1-10.
NPL 6: "I/O Virtualization: SR-IOV", (online), PCI-SIG. (search on Sep. 22, 2014), www.pcisig.com/specifications/iov.

SUMMARY OF INVENTION

Technical Problem

The problem in the existing solutions can be further summarized as two points as follows.

1. System Overhead of HA Results in Less Hosted VM

From the maximum configuration manual described in NPL 5, it is concluded that when HA function is enabled, the 36% overhead is introduced to the whole cluster system. It is mainly due to the system performance bottleneck of VMM. The HA-agent in each node is implemented as the software running on the same node as well as the monitored VMs, which its execution also results in the consumption of CPU resource of the node. That is the reason that when HA option is enabled, the HA-agent consumes the CPU resource of the node, results in the maximum number of hosted VM decreases from 100 to 64.

2. Less Scalability

Implementing HA function at VMM layers also results in less-scalability architecture. When the number of nodes increases, the HA-agent becomes the system performance bottleneck. Moreover, since HA-agent running at the same node with VMs, HA-agent and VMs are consumers of the same CPU resource.

The I/O bus system described in Patent Literature (PTL) 1 can solve these problems because traffic monitor unit 140 is independent from CPU and I/O device. Traffic monitor unit 140 described in PTL 1 monitors traffic between CPU and I/O device.

But, the recovery/diagnosis or any other extendable action is not mentioned in PTL 1. The I/O bus system described in PTL 1 focuses on the extracting group information to achieve more accurate traffic measurement, so that only monitoring is enough. And, the traffic monitor unit 140 described in PTL 1 monitors only the header of PCI-over-Ethernet packets.

An exemplary object of the present invention is to provide a management system, a management method, and a management program that can detect failure of virtual machines and trigger corresponded actions when failure is found in resource disaggregation data center architecture.

Solution to Problem

A management system according to the present invention is a management system for detecting failure of virtual machines and triggering corresponded actions when failure is found in resource disaggregation data center architecture, the management system including: resource pools which act as the hardware components on which multiple virtual machines are running; an inter-connecting network which connects various resource pools; and an HA manager which snoops all traffic of the inter-connecting network to detect failure of a target VM and triggers corresponded actions when failure is detected.

A management method according to the present invention is a management method executed in a device included in a virtualization system including resource pools acting as the hardware components on which multiple virtual machines are running and an inter-connecting network connecting various resource pools for detecting failure of virtual machines and triggering corresponded actions when failure is found in resource disaggregation data center architecture, the management method including: snooping all traffic of the inter-connecting network to detect failure of a target virtual machine; and triggering corresponded actions when failure is detected.

A management program according to the present invention is a management program for detecting failure of virtual machines and triggering corresponded actions when failure is found in resource disaggregation data center architecture, the management program causing a computer included in a virtualization system including resource pools acting as the hardware components on which multiple virtual machines are running and an inter-connecting network connecting various resource pools, to execute: a snooping process of snooping all traffic of the inter-connecting network to detect failure of a target virtual machine; and a triggering process of triggering corresponded actions when failure is detected.

Advantageous Effects of Invention

According to the present invention, failure of virtual machines can be detected and corresponded actions can be triggered when failure is found in resource disaggregation data center architecture.

DESCRIPTION OF EMBODIMENTS

In the following description, for the purpose of explanation, numerous specific details are set forth in order to provide a thorough understanding of the present invention. To describe exemplary purposes, aspects, and advantages, we use the following detailed description of an exemplary embodiment of the invention with reference to the drawings.

Figure 2:
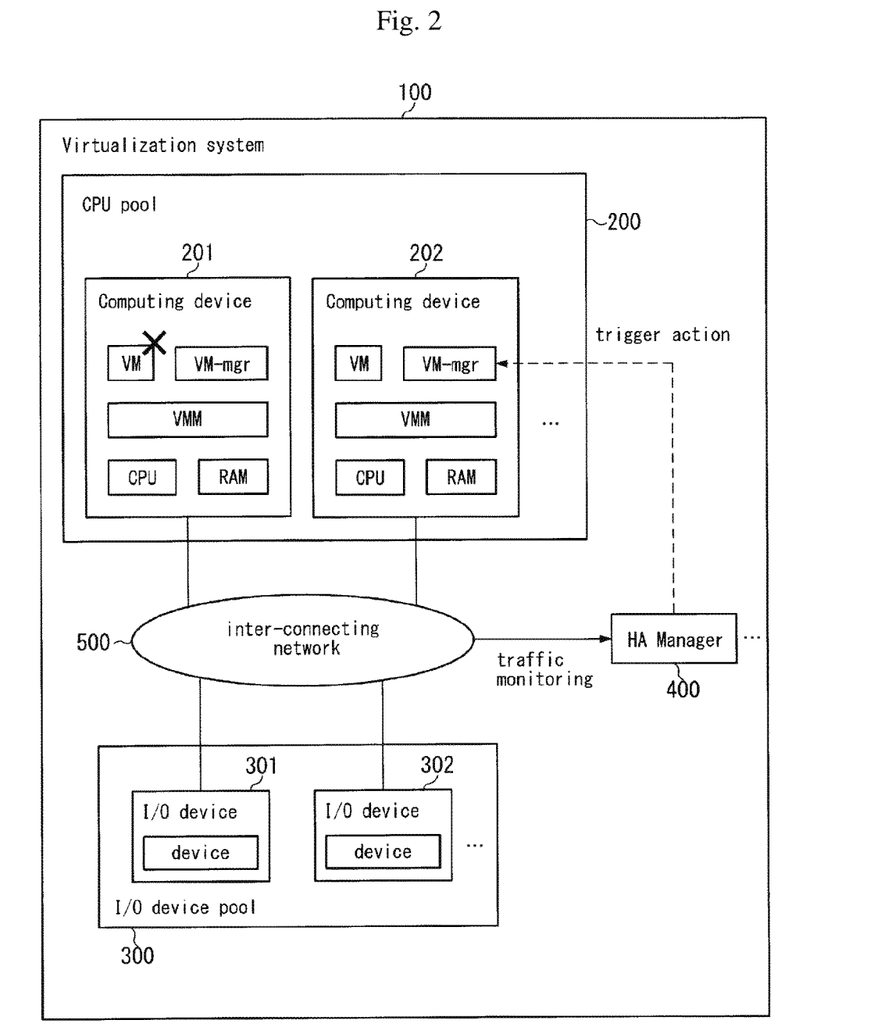
FIG. 2 It is a block diagram depicting a structural example of Exemplary Embodiment of a virtualization system according to the present invention.

FIG. 2 is a block diagram depicting a structural example of Exemplary Embodiment of a virtualization system according to the present invention. A virtualization system 100 depicted in FIG. 2 includes a CPU pool 200, an I/O device pool 300, an HA manager 400, and an inter-connecting network 500. A virtualization system 100 has a function of resource disaggregation data center. FIG. 2 depicts a structure of an HA manager 400 deployed in the resource disaggregation architecture.

The resource disaggregation data center architecture consists of various resource pools, such as CPU resource pool, storage pool, various I/O devices pool. To make the explanation of the components clear, in FIG. 2 only the CPU pool 200 and the I/O device pool 300 are drawn. In the CPU pool 200, there are multiple computing devices such as computing devices 201 and 202, they are connected to the corresponded I/O devices 301 and 302 respectively via the inter-connecting network 500.

FIG. 2 shows that in the resource disaggregation data center architecture, the VMM is running on the hardware (CPU and Random Access Memory (RAM)), and multiple VMs and a VM-manager (VM-mgr) is running on VMM. The VM-mgr contains various predefined actions of VM which can be triggered by the control command sent from the HA manager 400 (at least one), e.g. stop/start/restart operation of VM etc. It is noted that the predefined actions is not limited to above actions, but can be further extended.

The HA manager 400 have two network connections, one is the inter-connecting network 500, and the other is connected to the management network through which is connected to VM-mgr. As the solid arrow shown in FIG. 2, through the connection to the inter-connecting network 500, the HA manager 400 can snoop all heartbeat messages, control messages and all I/O traffic between CPU and I/O devices, e.g. traffic between the computing device 201 and the I/O device 301. Moreover, through the connection to VM-mgr, the control command of the HA manager 400 can be sent to the target VM-mgr to trigger corresponded predefined actions.

It is noted that because the HA manager 400 is completely independent from the resource disaggregation data center and snoops all traffics to determine its availability, there is nothing prevent the HA manager 400 from scaling to achieve workload load balancing, for example it can be configured that an HA manager is for a virtual local area network (VLAN).

Figure 3:
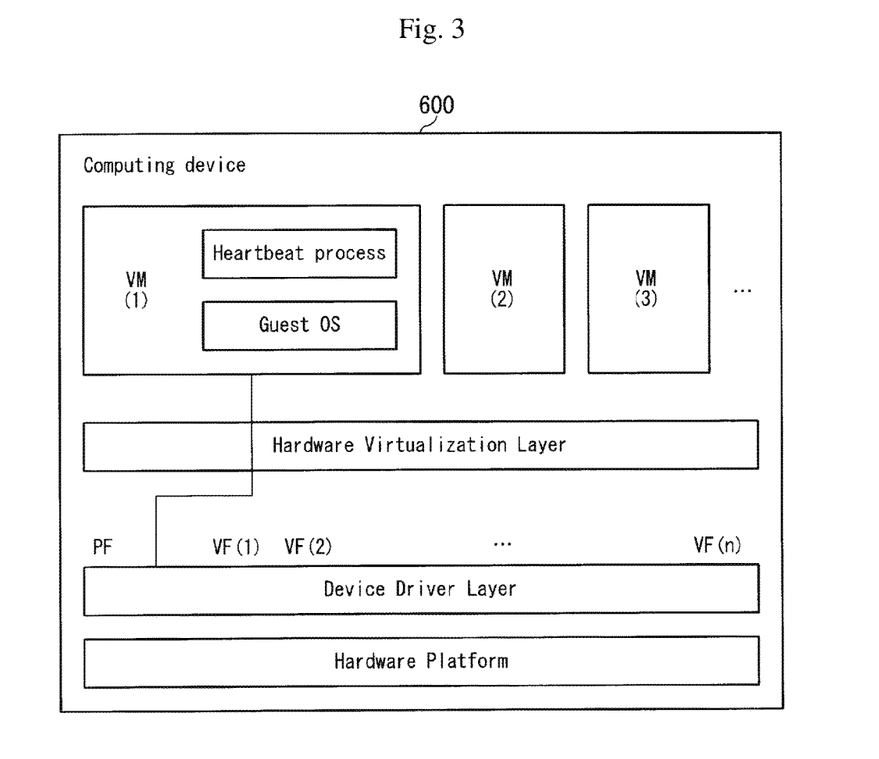
FIG. 3 It is a block diagram depicting a structural example of HA-VMs running on a computing device.

FIG. 3 is a block diagram depicting a structural example of HA-VMs running on typical computing devices, such as the computing device 201, 202 shown in FIG. 2, and the settings of corresponded devices. As a typical computing device 600, the device is usually virtualized so that it has one physical function interface (PF) and multiple virtual function interfaces (YE), e.g. SR-IOV described in NPL 5, which is possible the most well-known implementation of I/O virtualization.

The I/O virtualization is supported in the hardware device layer and it can be configured in device driver. Especially in the environment of NFV described in NPL 3, the telecommunication service is running inside VM, which is called service-VM. To achieve the best performance, the service-VM is usually configured to use VF interface of I/O devices directly, as it is shown in FIG. 3 VM(1) is configured to use VF(1) directly.

Figure 4:
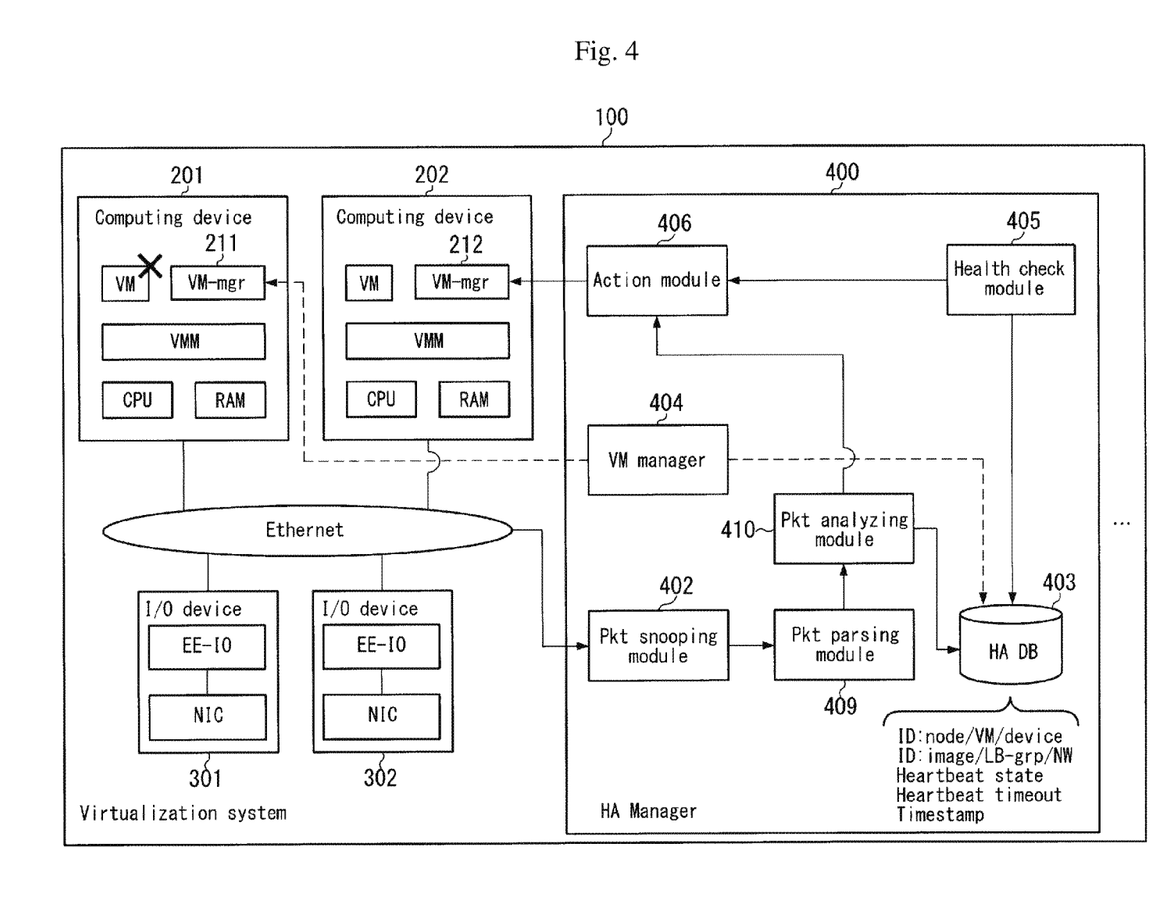
FIG. 4 It is a block diagram depicting a structural example of an HA manager 400.

FIG. 4 is a block diagram depicting a structural example of an HA manager 400. The HA manager 400 depicted in FIG. 4 includes a Packet (Pkt) snooping module 402, an HA database (DB) 403, a VM manager 404, a Health check module 405, an Action module 406, a Pkt parsing module 409 and a Pkt analyzing module 410.

As depicted in FIG. 4, the HA manager 400 is deployed in the resource disaggregation architecture. At least one HA manager is deployed in the resource disaggregation architecture. As an example of reference design, ExpEther is used as the inter-connecting technique, and the network interface card (NIC) is chosen as a representative of I/O device.

In FIG. 4, there are two kinds of workflow. The dotted workflow is the initiation and registration process before runtime detection, and its details are as follows. In FIG. 4, it shows that before a VM is launched, the VM manager 404 first saves the related information to the HA DB 403. The information includes: Node_Id (ID of the CPU pool), VM_Id (ID of VM), Device_Id (ID of the device pool), Image_Id (ID of the image used by VM), NW_Address (network address used by VM), NW_Id (ID of the network used by VM), Heartheat_State, Heartbeat_Timeout and Timestamp_Value. Then the VM manager 404 sends control command to a VM-mgr 211 to launch the VM.

The solid workflow is the process of runtime packet snooping and triggering actions, and its details are as follows. At runtime, the Pkt snooping module 402 will keep on snooping all concerned traffic, e.g. the traffic with a specific VLAN-tag. The traffic may be the heartbeat message, other control message or all data traffic between CPU and I/O device. In FIG. 4, ExpEther is chosen as the example of inter-connecting technique. It results that the all traffic should be PCI-over-Ethernet packets.

The Pkt parsing module 409 extracts corresponded info from the payload (the payload of PCI-over-Ethernet packets in the ExpEther environment). The Pkt analyzing module 410 processes the information as follows. 1). If it is a heartbeat message, the heartbeat_timestamp is to be updated; 2). If it is normal data I/O traffic, the traffic_timestamp is to be updated; 3). If it is diagnosis traffic, the corresponded diagnosis information is processed. There two kinds of timestamp are all saved in the HA DB 403, which are already generated during the process of initialization and registration.

The Health check module 405 is an individual task that periodically that checks the two timestamps. If heartbeat timeout or I/O activity timeout is detected, the Health check module 405 will notify the Action module 406. The Action module 406 will finally send the control command to a VM-mgr 212.

Figure 7:
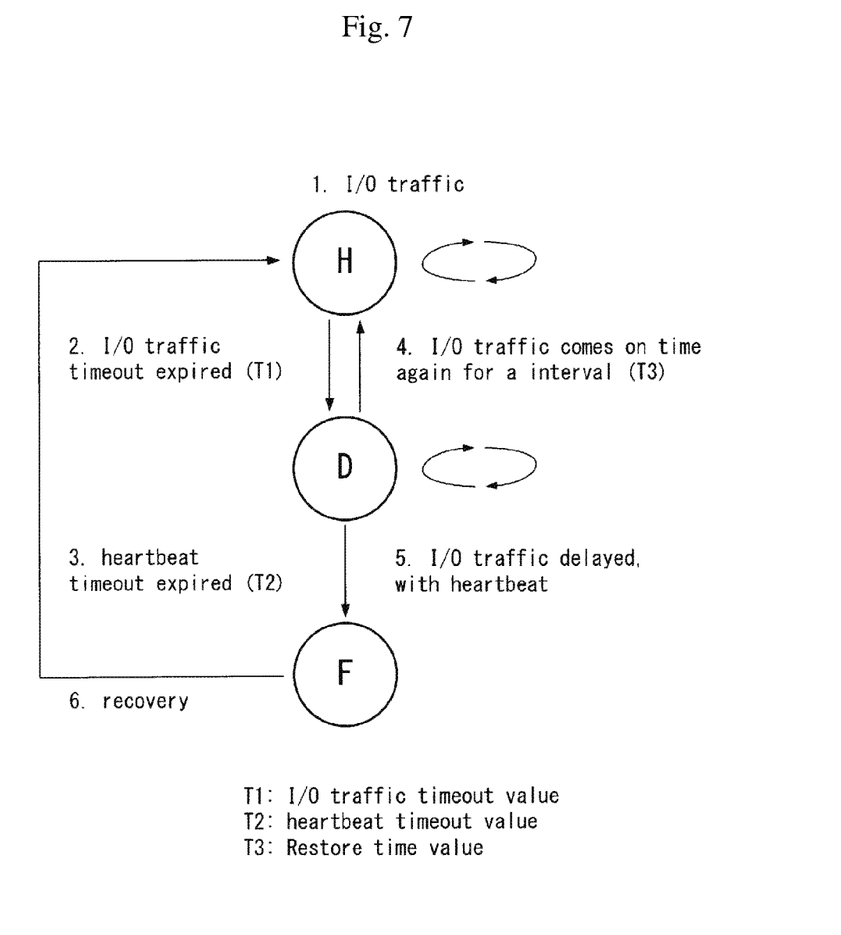
FIG. 7 It is a state transition diagram depicting an example of the method of adjustable heartbeat timeout and the process of state transition during the monitoring heartbeat and I/O traffic.

FIG. 7 is the state transition diagram. For more details, we will further explain two use cases in the sections USE CASE 1: FAILURE DETECTION AND RESETTING and USE CASE 2: FAILURE DETECTION AND DIAGNOSIS as follows.

The Pkt snooping module 402, the VM manager 404, the Health check module 405, the Action module 406, the Pkt parsing module 409 and the Pkt analyzing module 410 in this exemplary embodiment are, for example, realized by a CPU executing processes according to control of a program stored in a non-transitory computer-readable recording medium.

Figure 5:
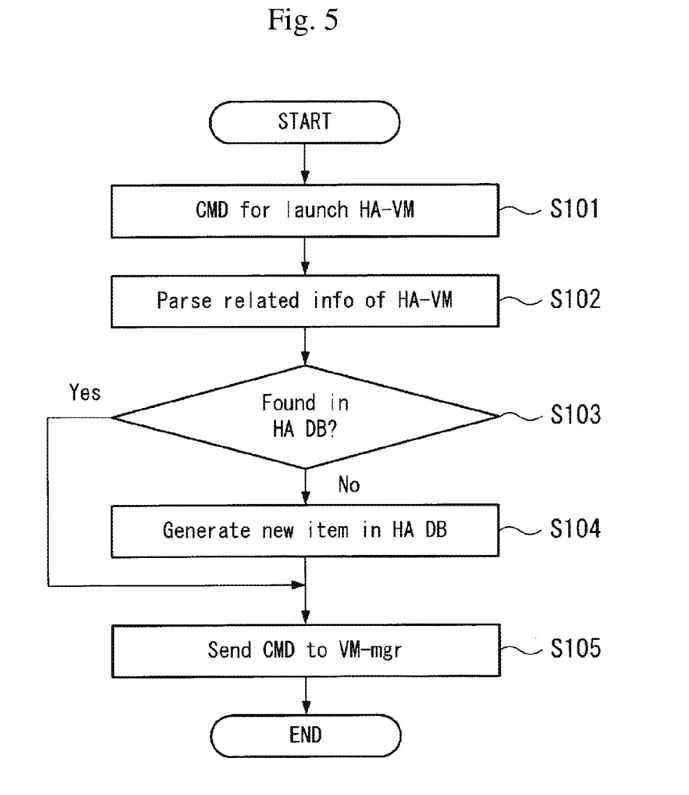
FIG. 5 It is a flowchart depicting operation of an initialization process and a registration process of HA-VM by the virtualization system 100.
Figure 6:
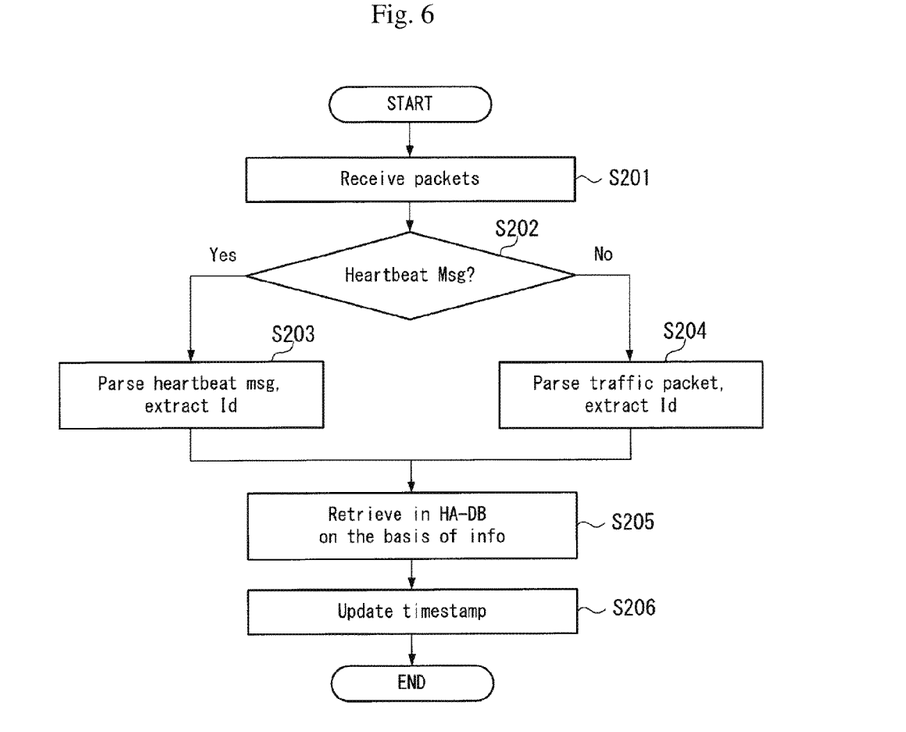
FIG. 6 It is a flowchart depicting operation of packet snooping process and heartbeat timestamp updating process by the virtualization system 100.

The following describes the operation of the virtualization system 100 in this exemplary embodiment, with reference to FIG. 5 and FIG. 6. FIG. 5 is a flowchart depicting operation of an initialization process and a registration process of HA-VM by the virtualization system 100.

It shows that after the command of launching a VM is received (step S101), the VM manager 404 parses first the control information of VM (step S102). The related information includes Node_Id (ID of the CPU pool), VM_Id (ID of VM), Device_Id (ID of the device pool), Image_Id (ID of the image used by VM), NW_Address (network address used by VM), NW_Id (ID of the network used by VM), Heartbeat_State, Heartbeat_Timeout and latest Timestamp_Value. Then the VM manager 404 retrieves in the HA DB 403 on the basis of the above info (step S103).

If the record is found in the HA DB 403 (step S103: Yes), the VM manager 404 will send the control command to the target node directly (step S105). Otherwise (step S103: No), the VM manager 404 will generate a new item in the HA DB 403 (step S104), and then the VM manager 404 will send the control command to the target node directly to launch the VM (step S105). The virtualization system 100 ends the initialization process and registration process.

FIG. 6 is a flowchart depicting operation of packet snooping process and heartbeat timestamp updating process by the virtualization system 100.

It shows that after the Pkt snooping module 402 receives the packets (step S201), first the Pkt parsing module 409 will parse the packet and determine it is a heartbeat message or normal data traffic (step S202). In the case where packet is a heartbeat message (step S202: Yes), the Pkt parsing module 409 will parse the heartbeat message (step S203). In the case where packet is a normal data traffic (step S202: No), the Pkt parsing module 409 will parse the normal data traffic packet (step S204). In both case, the Pkt analyzing module 410 will further extract the VM_Id and retrieve in the HA-DB 403 (step S205). Finally the Pkt analyzing module 410 will update the corresponded timestamps (it maybe heartbeat_timestamp or traffic_timestamp) (step S206). The virtualization system 100 ends the packet snooping process and heartbeat timestamp updating process.

FIG. 7 is a state transition diagram depicting an example of the method of adjustable heartbeat timeout and the process of state transition during the monitoring heartbeat and I/O traffic. The detail of the whole process will be explained as follows.

As FIG. 7 shows, the initialized value of I/O traffic_timeout is T1, the initialized value of heartbeat_timeout is T2 and the restore time value is T3. FIG. 7 shows there are three states of a target VM, which is H (healthy), D (I/O traffic delayed) or F (failed). At runtime, I/O traffic data are snooped, parsed and related info is extracted to update traffic_timestamp.

H: If no delay of I/O traffic occurs, the state of VM is remained as H (healthy).

H→D: Once I/O traffic is delayed, the state of the target VM switches to D (I/O traffic delayed) and heartbeat and diagnosis are enabled. D (I/O traffic delayed) state means I/O traffic is delayed (maybe the heartbeat message is on time), which may be caused by high workload in the environment of NFV. In the state of D, the diagnosis action notification will be sent to the target VM-mgr, e.g. let VM-mgr gather more system status from VM and report to action module.

D→H: In the state of D, if the I/O traffic keeps on time longer than the interval T3, the state switches back to H (healthy) and heartbeat and diagnosis will be disabled as well.

D→F: In the state of D, if the delay of heartbeat occurs, the state switches to F (failed). F (failed) state means that both timer of heartbeat message and timer of I/O traffic are expired, so that the target VM is believed unavailable.

F: In the state of F, the recovery action notification will be sent to the target VM-mgr.

In the previous patent described in PTL 1, a similar method of monitoring of traffic between CPU and I/O device is also proposed. The main difference is two-fold as follows.

Figure 8:
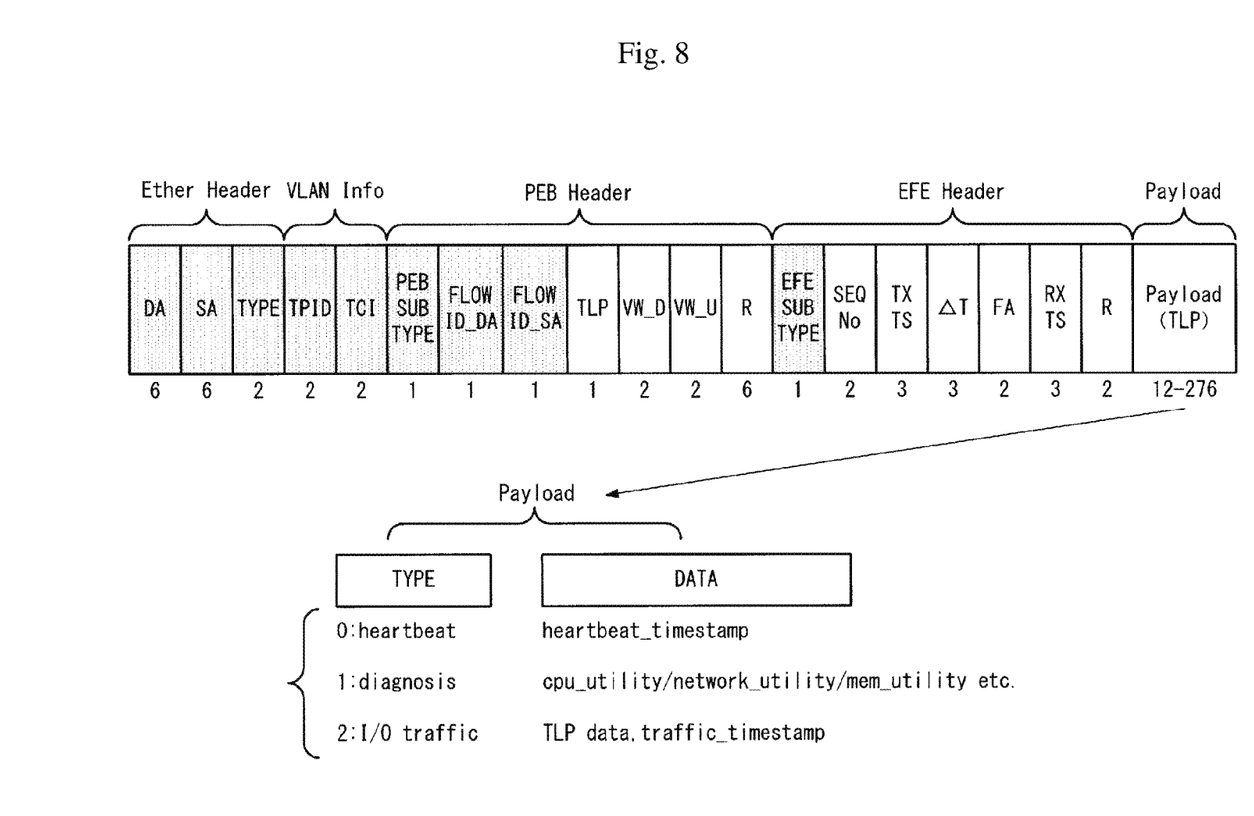
FIG. 8 It is an explanatory diagram depicting an example of extracting requirement information from three kinds of packets.

1. On the side of monitoring, the difference lies that it monitors the header of PCI-over-Ethernet packets, and extracts group management information from it. While in this patent, all traffic packets are snooped, parsed packet payload to extracts information related with system availability and system resource utilities. FIG. 8 is an explanatory diagram depicting an example of extracting requirement information from three kinds of packets. FIG. 8 shows some details of extracting requirement information from three kinds of packets.

ExpEther is chosen as the example of inter-connecting network in the resource disaggregated data center architecture, the packet format is show in FIG. 8. There are many data fields; we will only explain related ones (shaded data fields in FIG. 8) to show how to parsing the payload of the packet in the Pkt parsing module 409. If we want to know more details on the data fields and packet formant of ExpEther you can further refer NPL 2. The process of packet parsing in the Pkt parsing module 409 can be summarized as follows.

(1) Extract the Identification of VM, VLAN and Device

VM can be identified by the Media Access Control (MAC) address; hence Source Address (SA) or Destination Address (DA) data field in Ethernet header. VLAN info is provided in Tag Protocol Identifier (TPID) and device can be identified by the FLOWID_DA or FLOWID_SA in FIG. 8.

(2) Check the Data Frame Flag

There are multiple kinds of PCI-over-Ether packets. The EFE_SUB_TYPE indicates the payload (TLP) is a data frame or other types.

(3) Extract of Info from Payload

For the data frame, we extended its format as type and data. The type can be heartbeat, diagnosis or I/O traffic, and it can be extended without any limited. The layout of payload depends on the type of the payload. If it is heartbeat type, the data refers heartbeat timestamp; if it is diagnosis type, system resource utilization will be provided, e.g. CPU utilization, network interface utilization or memory utilization; if it is an I/O traffic type, it refers the TLP data and its timestamp.

2. On the side of action, the recovery/diagnosis or any other extendable action is not mentioned in PTL 1. The previous patent focuses on the extracting group information to achieve more accurate traffic measurement, so that only monitoring is enough. While in this patent, it aims to enhance system availability by detection and following actions. Moreover, the cooperation between detection module and action module, the heartbeat workload is decreased by snooping I/O traffic of VM when there is I/O traffic. Only when there is no I/O traffic for a certain interval, the heartbeat message will be used to detect availability of the target VM.

The virtualization system in this exemplary embodiment includes a method for detecting failure of VM and further triggering corresponded actions. More specifically, the virtualization system includes monitoring modules (at least one) and action modules (at least one) in the resource disaggregation architecture described in NPL 1, where the monitoring modules are in charge of failure detection and the action modules are in charge of execution of actions which are corresponded to individual failure.

The resource disaggregation architecture consists of individual resource pools, such as CPU resource pool, storage resource pool etc., and these resource pools are connected via inter-connecting technique such as ExpEther described in NPL 2. On the basis of monitored I/O traffic of VM between CPU and I/O devices instead of conventional heartbeat messages, the evaluation factor of availability of VM is estimated. According to the result of evaluation factor of availability of VM, the corresponded action will be triggered.

For example, if there is no either I/O traffic or heartbeat message, the action is to re-launch the unavailable VM on another physical server. If there is no I/O traffic for a specific interval, the action is to send diagnosis message to VM to further confirm its availability and enable heartbeat messages. It is noted that the action is not limited to these two kinds of actions but can be further extended.

Example 1

Use Case 1: Failure Detection and Resetting

Figure 9:
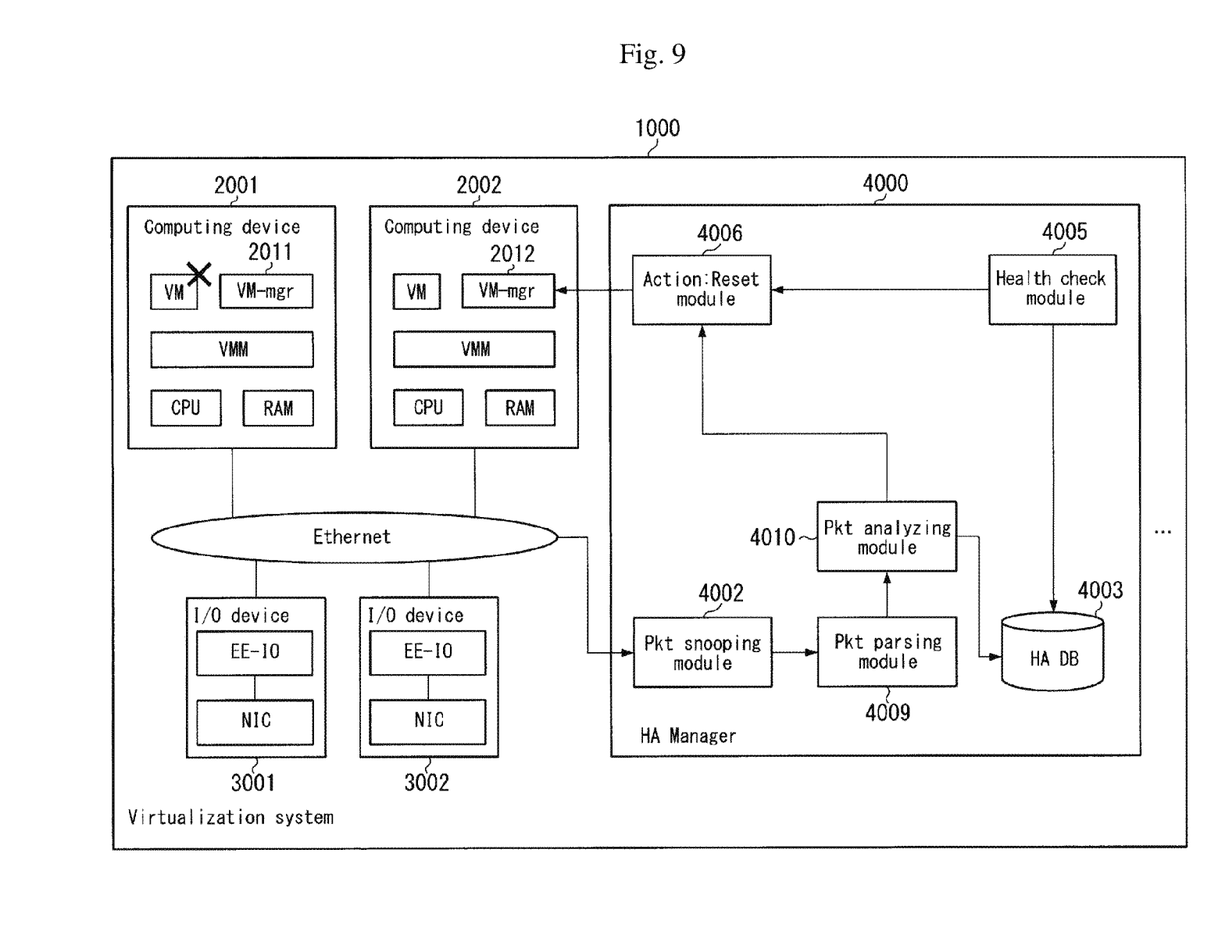
FIG. 9 It is an explanatory diagram depicting an example of the use of the virtualization system 1000.

FIG. 9 is an explanatory diagram depicting an example of the use of the virtualization system 1000. FIG. 9 shows a use case that when failure of the target VM is detected and then a new instance of the same VM is launched on another node.

The patent proposal is performing VM failure detection and analyzing availability of VM by snooping packets of inter-connecting network in the resource disaggregation data center architecture. During the process of system initialization, it snoops I/O traffic instead of heartbeat message to evaluate the system availability, so that it has lower workload comparing with conventional HA solution based on heartbeat message. Only when I/O traffic delays for a predefined interval, the heartbeat and diagnosis will be enabled.

FIG. 7 is the system state transition diagram. We explain its runtime behavior in more details on the basis of FIG. 9.

1). at system runtime, the Pkt snooping module 4002 will keep on snooping all concerned traffic, e.g. the traffic with a specific VLAN-tag. The packets are parsed in the Pkt parsing module 4009 and further analyzed in the Pkt analyzing module 4010.

2). the payload of the snooped packets can be heartbeat, normal I/O traffic data and diagnosis data. According to FIG. 7, at system initialization the heartbeat and diagnosis is disabled. Only normal I/O traffic data is snooped. When I/O traffic timeout, the heartbeat and diagnosis is enabled, then all three kinds of traffic are snooped. The corresponded process of analysis in the Pkt analyzing module 4010 of different kinds of packets is as follows.

As for the normal I/O traffic data, the Pkt analyzing module 4010 extracts the timestamp of the normal I/O traffic and retrieves the corresponded record in the HA DB 4003, and updates the traffic timestamp field of the record.

As for the heartbeat message, the Pkt analyzing module 4010 extracts the timestamp of heartbeat and retrieves the corresponded record in the HA DB 4003, and updates the heartbeat timestamp field of the record.

As for the diagnosis data, the Pkt analyzing module 4010 extracts the diagnosis information e.g. system resource utilization (CPU utilization, network utilization, memory utilization) and retrieves the corresponded record in the HA DB 4003, and stores the diagnosis info into diagnosis field of the record.

3). the Health check module 4005 is an individual task that periodically that checks the two timestamps in the HA DB 4003. According to the state transition diagram in FIG. 7, if both heartbeat timeout and I/O activity timeout are detected, the Health check module 4005 will select a new VM-mgr 2012 and then notify the Action: Reset module 4006. The Action: Reset module 4006 will finally send the reset command to the VM-mgr 2012 to launch a new instance of the target VM.

Example 2

Use Case 2: Failure Detection and Diagnosis

Figure 10:
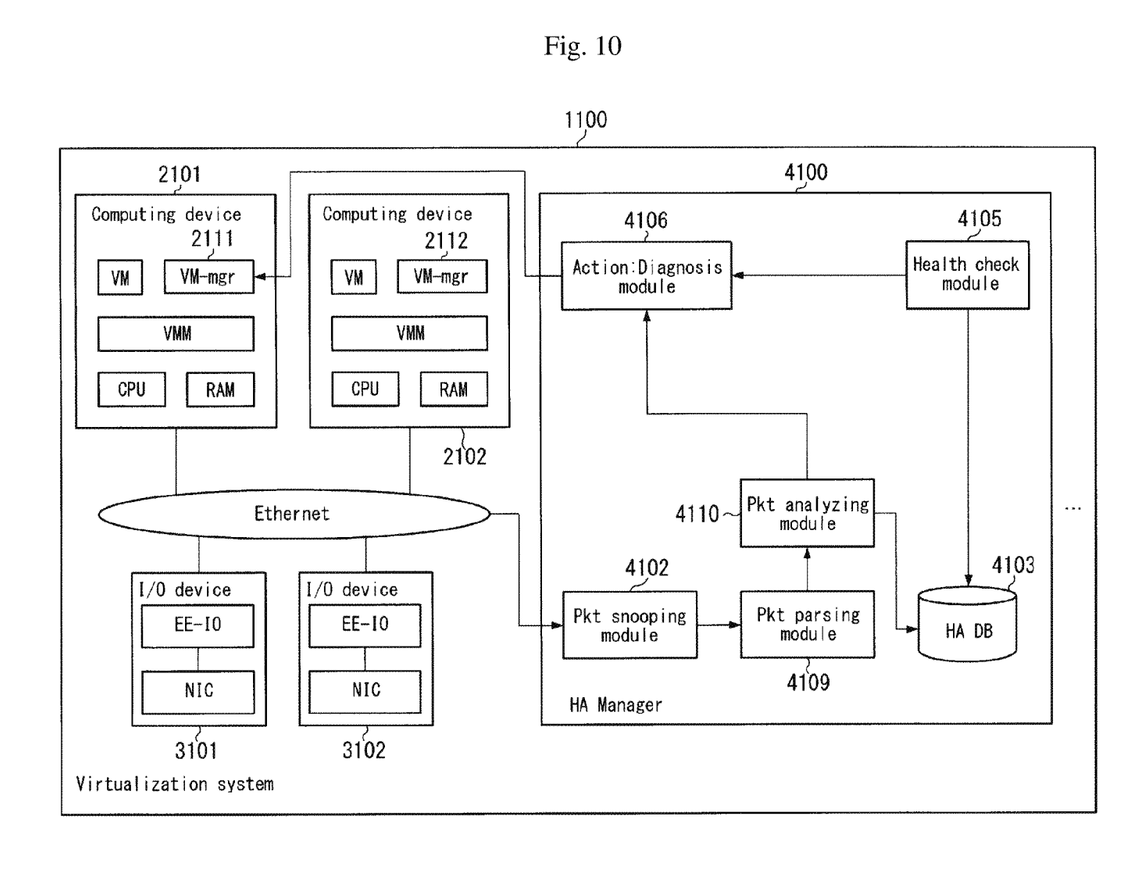
FIG. 10 It is an explanatory diagram depicting another example of the use of the virtualization system 1100.

FIG. 10 is an explanatory diagram depicting another example of the use of the virtualization system 1100. FIG. 10 shows a use case that when delay of the heartbeat of the target VM is detected and then HA manager triggers diagnosis actions to gather more information as well as heartbeat message is enabled.

Comparing with the use case in FIG. 9, the diagnosis information helps data center operator or administrator to understand the performance penalty and further locate the problem. Moreover, after system initialization, it snoops I/O traffic instead of heartbeat message to confirm the system availability, so that it has lower workload comparing HA solution based on heartbeat message. When I/O traffic delays for a predefined interval, the heartbeat and diagnosis will be enabled. If delay of I/O traffic disappears for a certain interval, the heartbeat and diagnosis will be disabled vice via.

FIG. 7 is the system state transition diagram. We explain its runtime behavior in more details on the basis of FIG. 10.

1). at system runtime, the Pkt snooping module 4102 will keep on snooping all concerned traffic, e.g. the traffic with a specific VLAN-tag. The packets are parsed in the Pkt parsing module 4109 and further analyzed in the Pkt analyzing module 4110.

2). the payload of the snooped packets can be heartbeat, normal I/O traffic data and diagnosis data. According to FIG. 7, at system initialization the heartbeat and diagnosis is disabled. Only normal I/O traffic data is snooped. When I/O traffic timeout, the heartbeat and diagnosis is enabled, then all three kinds of traffic are snooped. The corresponded process of analysis in the Pkt analyzing module 4110 of different kinds of packets is as follows.

As for the heartbeat message, the Pkt analyzing module 4110 extracts the timestamp of heartbeat and retrieves the corresponded record in the HA DB 4103, and updates the heartbeat timestamp field of the record.

As for the normal I/O traffic data, the Pkt analyzing module 4110 extracts the timestamp of the normal I/O traffic and retrieves the corresponded record in the HA DB 4103, and updates the traffic timestamp field of the record.

As for the diagnosis data, the Pkt analyzing module 4110 extracts the diagnosis information e.g. system resource utilization (CPU utilization, network utilization, memory utilization) and retrieves the corresponded record in the HA DB 4103, and stores the diagnosis info into diagnosis field of the record.

3). the Health check module 4105 is an individual task that periodically that checks the two timestamps in the HA DB 4103. According to the state transition diagram in FIG. 7, if only I/O traffic timeout is detected, the Health check module 4105 will notify the Action: Diagnosis module 4106 and the Action: Diagnosis module 4106 will further send the diagnosis command to a VM-mgr 2111 to request more diagnosis information of the target VM, e.g. system resource utilization (but not limited to it). Moreover, the Action: Diagnosis module 4106 will enable the heartbeat message of the target VM.

Figure 11:
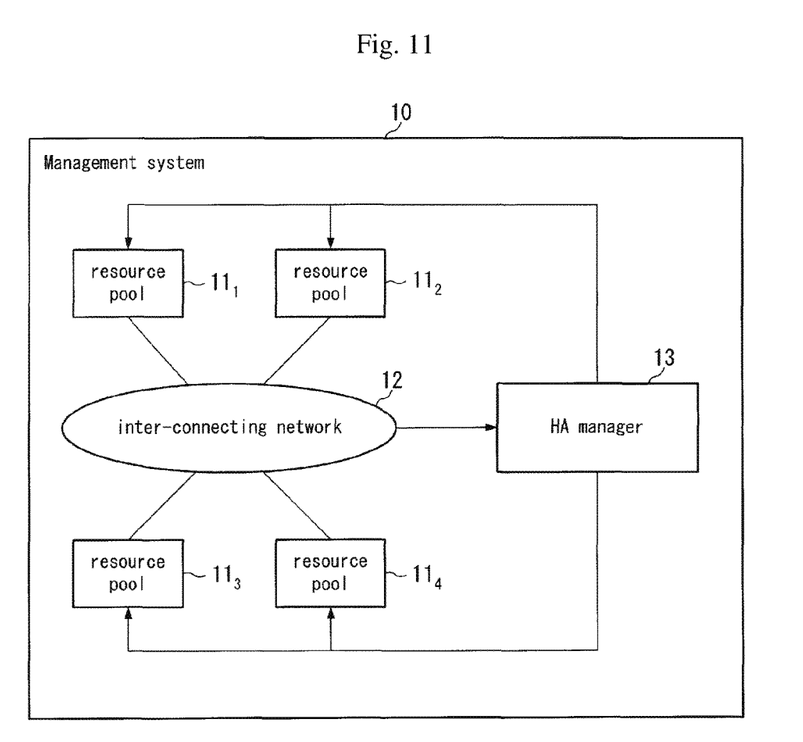
FIG. 11 It is a block diagram schematically depicting a management system according to the present invention.

The following describes the overview of the present invention. FIG. 11 is a block diagram schematically depicting a management system according to the present invention. A Management system 10 according to the present invention is a management system for detecting failure of virtual machines and triggering corresponded actions when failure is found in resource disaggregation data center architecture, the Management system 10 includes: resource pools 11₁-11₄ (e.g. CPU pool 200, device pool 300) which act as the hardware components on which multiple virtual machines are running; an inter-connecting network 12 (e.g. inter-connecting network 500) which connects various resource pools; and an HA manager 13 (e.g. HA manager 400) which snoops all traffic of the inter-connecting network 12 to detect failure of a target VM and triggers corresponded actions when failure is detected.

With such a structure, the management system can detect failure of virtual machines and trigger corresponded actions when failure is found in resource disaggregation data center architecture.

Moreover, the HA manager 13 may comprise: a snooping module (e.g. Pkt snooping module 402) which snoops all traffic of the inter-connecting network 12; a packet parsing module (e.g. Pkt parsing module 409) which parses the snooped packet and extracts info from header and payload to; a VM-manager (e.g. VM manager 404) which provides basic operation of VMs on the same computing device; an action module (e.g. Action module 406) which sends predefined commands to the local VM-manager; and an HA-DB (e.g. HA DB 403) which stores records of all target VMs, and the packet parsing module may determine whether the heartbeat message from a VM arrives on time or delayed or missing, determine whether there is I/O traffic from a VM or not, and determine whether the current status is follow the predefined normal patterns or not; and the VM-manager may start a new instance of a specific VM, and gather further info of a specific VM, such system resource utility etc.; and the action module may start a new instance of the target VM when the VM is believed unavailable, and send diagnosis command to gather more information of the VM.

Moreover, the records stored the HA-DB at least may comprise: Node_Id (ID of the CPU pool); VM_Id (ID of the VM); Device_Id (ID of the device); Image_Id (ID of the image used by VM); NW_Address (network address used by VM); NW_Id (ID of the network used by VM); Heartbeat_state (the state of heartbeat message); Traffic_state (the state of I/O traffic); Heartbeat_timeout (the default value of heartbeat timeout); Traffic_timeout (the default value of I/O traffic timeout), and the NW_Address may be MAC address when ExpEther is used, and the Heartbeat_state may be either healthy or delayed, and the Traffic_state may be either healthy or delayed.

Moreover, the packet parsing module may extract the corresponded info from the heartbeat message, extract the corresponded info from the normal I/O traffic message, and extract the corresponded info from system resource utilization message.

Moreover, the packet parsing module may determine the heartbeat timeout expires or not, and determine the I/O traffic timeout expires or not.

Moreover, the action module may just update the corresponded timer if there is neither heartbeat timeout nor I/O traffic timeout, require system resource info for further diagnosis if I/O traffic timeout occurs, and trigger the recovery action if both heartbeat timeout and I/O traffic timeout occur.

A non-transitory computer-readable recording medium having recorded therein a management program according to the present invention is a management program for detecting failure of virtual machines and triggering corresponded actions when failure is found in resource disaggregation data center architecture, the management program causing a computer included in a virtualization system including resource pools acting as the hardware components on which multiple virtual machines are running and an inter-connecting network connecting various resource pools, to execute: a snooping process of snooping all traffic of the inter-connecting network to detect failure of a target virtual machine; and a triggering process of triggering corresponded actions when failure is detected.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

10 Management system
$11_1$-$11_4$ resource pool
12,500 inter-connecting network
13,400,4000,4100 HA manager
100,1000,1100 Virtualization system
200 CPU pool
201,202,600,2001,2002,2101,2102 Computing device
211,212,2011,2012,2111,2112 VM-mgr
300 I/O device pool
301,302,3001,3002,3101,3102 I/O device
402,4002,4102 Pkt snooping module
403,4003,4103 HA DB
404 VM manager
405,4005,4105 Health check module
406 Action module
409,4009,4109 Pkt parsing module
410,4010,4110 Pkt analyzing module
4006 Action: Reset module
4106 Action: Diagnosis module

The invention claimed is:

1. A management system for detecting failure of virtual machines and triggering corresponded actions when failure is found in resource disaggregation data center architecture, the management system comprising:
   resource pools which act as hardware components on which multiple virtual machines are running;
   an inter-connecting network which connects various resource pools; and
   a high availability (HA) manager which snoops all traffic of the inter-connecting network to detect failure of a target virtual machine (VM) and triggers corresponded actions when failure is detected,
   wherein the HA manager comprises:
     a snooping module which snoops all traffic of the inter-connecting network;
     a packet parsing module which parses a snooped packet and extracts info from header and payload of a parsed packet;
     a VM-manager which provides basic operation of VMs on a computing device which is connected to the VM-manager;
     an action module which sends predefined commands to a local VM-manager; and
     an HA-database (DB) which stores records of all target VMs,
   wherein the packet parsing module determines whether a heartbeat message from a VM arrives on time or delayed or missing, determines whether there is I/O traffic from a VM or not, and determines whether current status is follow predefined normal patterns or not,
   wherein the VM-manager starts a new instance of a specific VM, and gathers further info of a specific VM, such system resource utility and system availability, and
   wherein the action module starts a new instance of a target VM when a VM is believed unavailable, and sends diagnosis command to gather more information of the target VM.

2. A management system according to claim 1, wherein the records of all target VMs stored in the HA-DB comprise:
   Node_Id: ID of a CPU pool;
   VM_Id: ID of the VM;
   Device_Id: ID of a device;
   Image_d: ID of an image used by VM;
   NW_Address: network address used by VM;
   NW_Id: ID of a network used by VM;
   Heartbeat_state: a state of a heartbeat message;
   Traffic_state: a state of I/O traffic;
   Heartbeat_timeout: a default value of heartbeat timeout;
   Traffic_timeout: a default value of I/O traffic timeout,
   wherein the NW_Address may be MAC address when ExpEther is used,
   wherein the Heartbeat_state may be either healthy or delayed, and
   wherein the Traffic_state may be either healthy or delayed.

3. A management system according to claim 2, wherein the packet parsing module determines whether the heartbeat timeout expires or not, and determines whether the I/O traffic timeout expires or not.

4. A management system according to claim 3, wherein the action module just updates a corresponded timer if there is neither heartbeat timeout nor I/O traffic timeout;
  wherein the action module requires system resource info for further diagnosis if I/O traffic timeout occurs; and
  wherein the action module triggers a recovery action if both heartbeat timeout and I/O traffic timeout occur.

5. A management system according to claim 2, wherein the packet parsing module extracts corresponded info from a heartbeat message, extracts corresponded info from a normal I/O traffic message, and extracts corresponded info from diagnosis information.

6. A management system according to claim 1, wherein the packet parsing module extracts corresponded info from a heartbeat message, extracts corresponded info from a normal I/O traffic message, and extracts corresponded info from diagnosis information.

7. A management method executed in a device included in a virtualization system including resource pools acting as hardware components on which multiple virtual machines are running and an inter-connecting network connecting various resource pools for detecting failure of virtual machines and triggering corresponded actions when failure is found in resource disaggregation data center architecture, the management method comprising:
  snooping all traffic of the inter-connecting network;
  parsing a snooped packet;
  extracting info from header and payload of a parsed packet;
  determining whether a heartbeat message from a virtual machine (VM) arrives on time or delayed or missing;
  determining whether there is I/O traffic from a VM or not;
  determining whether current status is follow predefined normal patterns or not;
  providing basic operation of VMs on a computing device which is connected to the inter-connecting network for starting a new instance of a specific VM;
  gathering further info of a specific VM, such system resource utility and system availability;
  sending predefined commands to a local VM-manager for starting a new instance of a target VM when a VM is believed unavailable; and
  sending diagnosis command to gather more information of the target VM.

8. A non-transitory computer-readable recording medium having recorded therein a management program for detecting failure of virtual machines and triggering corresponded actions when failure is found in resource disaggregation data center architecture, the management program causing a computer included in a virtualization system including resource pools acting as hardware components on which multiple virtual machines are running and an inter-connecting network connecting various resource pools, to execute:
  a snooping process of snooping all traffic of the inter-connecting network;
  a parsing process of parsing a snooped packet;
  an extracting process of extracting info from header and payload of a parsed packet;
  a determining process of determining whether a heartbeat message from a VM arrives on time or delayed or missing; a determining process of determining whether there is I/O traffic from a VM or not;
  a determining process of determining whether current status is follow predefined normal patterns or not;
  a providing process of providing basic operation of VMs on a computing device which is connected to the inter-connecting network for starting a new instance of a specific VM;
  a gathering process of gathering further info of a specific VM, such system resource utility and system availability;
  a sending process of sending predefined commands to a local VM-manager for starting a new instance of a target VM when a VM is believed unavailable; and
  a sending process of sending diagnosis command to gather more information of the target VM.

* * * * *

UNITED STATES PATENT AND TRADEMARK OFFICE
CERTIFICATE OF CORRECTION

PATENT NO. : 10,318,392 B2
APPLICATION NO. : 15/517031
DATED : June 11, 2019
INVENTOR(S) : Sun et al.

Page 1 of 1

It is certified that error appears in the above-identified patent and that said Letters Patent is hereby corrected as shown below:

In the Specification

Column 5, Line 17; Delete "(YE)," and insert --(VF),-- therefor

Column 5, Line 49; Delete "Heartheat_State," and insert --Heartbeat_State,-- therefor In the Claims Column 12, Line 51; In Claim 2, delete "Image_d:" and insert --Image_Id:-- therefor Signed and Sealed this
Seventeenth Day of September, 2019

Andrei Iancu
*Director of the United States Patent and Trademark Office*